2/21/84  
OR 4,432,607

United States Patent [19]
Levy

[11] 4,432,607

[45] Feb. 21, 1984

[54] HOT MELT COATED OPTICAL FIBER

[75] Inventor: Alvin C. Levy, DeKalb County, Ga.

[73] Assignee: Bell Telephone Laboratories, Incorporated, Murray Hill, N.J.

[21] Appl. No.: 315,429

[22] Filed: Oct. 27, 1981

[51] Int. Cl.³ .............................................. G02B 5/172
[52] U.S. Cl. ................................... 350/96.34; 65/3.4; 350/96.30; 427/163
[58] Field of Search ............... 350/96.30, 96.31, 96.33, 350/96.34, 96.29; 65/3.1, 3.11, 3.4, 3.43, 3.44; 427/163; 524/505

[56] References Cited

U.S. PATENT DOCUMENTS 3,876,405  4/1975  Eilerman ............................. 65/3.43
4,042,555  8/1977  Raimondi et al. .................. 524/505
4,147,407  4/1979  Eichenbaum et al. ............. 350/96.34
4,198,121  4/1980  Le Davay et al. ................. 350/96.30

*Primary Examiner*—John D. Lee
*Attorney, Agent, or Firm*—James H. Fox

[57] ABSTRACT

A hot melt optical fiber coating comprising a thermoplastic rubber block copolymer reduces microbending losses over a wide service temperature range, typically down to at least −40 degrees Celsius, while obtaining an upper temperature limit of at least 90 degrees Celsius. The processing properties, including shelf life, cure rate, and toughness, are superior to typical prior art materials, such as silicones. The inventive coating can be used as the inner coating of a dual-layer coated fiber or as a single coating layer.

10 Claims, 2 Drawing Figures

HOT MELT COATED OPTICAL FIBER

BACKGROUND OF THE INVENTION

1. Field of the Invention

This invention concerns optical fibers having one or more coated layers thereon.

2. Description of the Prior Art

Optical fibers require protective coatings in order to preserve fiber strength and to protect the fiber from microbending induced optical loss. The coating is generally applied in-line with fiber drawing by passing the fiber through a reservoir containing the coating material and having an exit orifice which has been sized to apply some desired thickness of the material. This technique usually requires the coating material to have a viscosity below approximately 10,000 centipoises at the application temperature if high draw rates, 1 meter/second or higher, are desired. Classes of materials which have been applied to optical fibers by this technique include ultraviolet (UV) curables, thermal curables, solvent-based materials, and hot melts. For an example of the latter, see "Silicone-and-Ethylene-Vinyl-Acetate-Coated Laser-Drawn Silica Fibres with Tensile Strengths >3.5 GN/m² (500 kp.s.i.) in >3 km Lengths," T. J. Miller et al, *Electronics Letters*, Vol. 14, No. 18, pages 603–605 (1978). The "curable" materials are applied as liquids, and solidify by polymerization, which is typically accelerated by ultraviolet radiation or by heating. The solvent-based materials solidify by the removal of the solvent, which again can be accelerated by heating. In contrast, "hot melt" materials have low viscosity at high temperature and solidify upon cooling.

Properties of the coating material which influence the ability to preserve fiber strength are its toughness, abrasion resistance, adhesion to the fiber, and thickness. In general, an increase in any of these properties reduces the susceptibility of the fiber to mechanical damage. In addition, low water absorption by the coating is desirable to preserve fiber strength.

The property of the coating material which correlates most closely to microbending sensitivity is modulus. In general, a reduction in the coating modulus decreases microbending sensitivity. The temperature range over which a low modulus is required depends upon the environment the fiber is expected to experience. For the temperature range −40 to 90 degrees Celsius, the 30 minute tensile relaxation modulus should typically be less than $10^8$ dynes/cm². This wide operating temperature range for the coated fiber represents expected extremes of service conditions. Many prior art optical fiber coating materials have not obtained good microbending performance over the above wide temperature range.

Thus, in the past, thermally cured silicones with a modulus below $10^7$ dynes/cm² over the expected operating temperature have been used as coating where low sensitivity to microbending is required. Unfortunately, a low modulus also often means insufficient toughness and abrasion resistance for adequate strength protection of the fiber. Such is the case with the silicones. For this reason, a secondary coating is often placed over the primary silicone for strength protection.

Silicones also have process limitations in terms of preapplication stability and capability for application at high fiber draw rates, i.e., >1 meter/second, due to their curing behavior. For example, a silicon formulation typically comprises two components that begin to react upon mixing. They further react more rapidly as the hot fiber, drawn at high temperature from a preform, transfers heat to the bulk coating material in the reservoir. As the reaction continues, the viscosity of the silicone increases, ultimately reaching an unusable value if not applied soon enough to the fiber. Thus, the useful lifetime in the applicator is limited, typically being about 2 hours. This typically limits the amount of material that can be maintained in the mixed state, requiring frequent replenishment of the applicator, and sometimes results in an interruption of the coating process.

Another problem concerns the ability to transfer heat to the silicones rapidly enough to cure and harden before the fiber contacts the guide wheel and pulling apparatus. This hardening is necessary to preserve the strength of the fiber and maintain coating quality. Typically with a silicone coating, a furnace is placed below the coating applicator to accelerate the curing process. As draw rates increase, longer furnaces are required, which in turn, require higher draw towers, an expensive solution. The problem is compounded with dual-layer coatings, wherein both coatings must harden in the time and space available, and with the necessity that the first coating harden sufficiently prior to applying the second coating. It is thus desirable to obtain other optical fiber coating materials having good microbending performance over a wide temperature range, and having processing characteristics suitable for high-speed fiber manufacture.

SUMMARY OF THE INVENTION

I have invented an optical fiber coating material based on a block copolymer rubber. The coating material is typically applied to the fiber at a coating temperature of 150 to 200 degrees Celsius. The end-use properties are attained on cooling.

The material can be used alone as a single-layer coating for optical fibers or as the inner coating of a dual-coated fiber. It can be applied at draw rates in excess of 1 meter/second, and typically has a pot life in excess of 24 hours at elevated temperatures.

The material according to the invention is a mixture of:

(X) An ASTM type (according to ASTM D-2226 test) 103, 104A, or 104B, or mixtures thereof, napthenic or paraffinic oil having a minimum specific gravity of 0.860, and a maximum pour point ASTM 097 of approximately −4 degrees Celsius (25 degrees F.);

(Y) A styrene-rubber-styrene block copolymer having a styrene-rubber ratio of approximately 0.2 to 0.5 and preferably about 0.4, with the rubber typically being ethylene butylene; and optionally (Z) A resin which associates with the styrene end-blocks in the block copolymer, such as coumarone-indene copolymer or vinyl toluene −α methyl styrene copolymer, and having a ring and ball softening point, ASTM E-28, between 100 and 160 degrees Celsius.

The material further optionally comprises a wax. In the case of a single-layer or outer-layer coating, this wax is preferably a microcrystalline wax, with a melting point, ASTM D-127, above 70 degrees Celsius. In the case of an inner layer coating, the wax can be microcrystalline, paraffinic, polyethylene, etc. The material further comprises a thermal oxidative stabilizer such as tetrakis [methylene 3-(3',5'-di-tert-butyl-4'-hydroxyphenyl) proprionate] methane (Ciba-Geigy's Irganox 1010), or other suitable thermal oxidative stabilizer known in the art.

If an overcoat is applied for strength protection, the optional wax, and end-block resin (Z), can in some cases be omitted.

The amounts of the foregoing ingredients are typically combined in the proportions described below. Other styrene block copolymers with a saturated rubber midblock, such as hydrogenated polyisoprene or hydrogenated polybutadiene, are also satisfactory.

BRIEF DESCRIPTION OF THE DRAWING

In FIGS. 1 and 2, the XZ axis indicates the total parts oil and microcrystalline wax. All components in the FIGS. are specified in terms of weight percentage of the total mixture exclusive of the thermal oxidative stabilizer.

DETAILED DESCRIPTION

The following description relates to an inventive coating material that exhibits low modulus down to approximately −40 degrees Celsius, yet has significantly greater toughness than the silicones, and significantly alleviates the process limitations previously discussed. One component of the coating material is a block copolymer.

In a block copolymer molecule, two or more polymer segments of different chemical composition are attached end-to-end. This is in contrast to random copolymers where the basic monomer units are randomly polymerized to form the polymer molecule.

In the styrene-ethylene butylene-styrene (SEBS) block copolymer used in this work, the styrene and ethylene-butylene blocks are incompatible and therefore form separate phases or domains. The styrene domains are rigid and act as physical crosslinks up to the glass transition temperature of polystyrene, about 90 degrees Celsius. The ethylene-butylene phase is flexible down to its glass transition temperature, about −65 degrees Celsius. The SEBS material therefore behaves as a crosslinked rubber between −65 and 90 degrees Celsius. Also, since the midblock is saturated, the SEBS molecule possesses good thermal oxidative stability at elevated temperature.

I have determined that the above combination of properties, when combined with the other components described below, makes the SEBS thermoplastic rubber a useful component for an optical fiber coating material both for processing and end-use properties. Other thermoplastic styrene-rubber-styrene block copolymers can also be used. Typical examples include those having hydrogenated polyisoprene or hydrogenated polybutadiene as the rubber midblock.

One can choose additives which are compatible with the styrene blocks or additives compatible with the rubber block. Compatibility may be preferential; that is, an additive can be compatible with both but prefer one. Not all additives work the same; e.g., xylene will weaken the styrene domains while coumarone-indene resins can strengthen them. In the case of the rubber midblock, one can add oils to reduce the modulus or polycrystalline materials, such as waxes, to raise the modulus. The preferred coating material herein maintains or strrengthens the styrene domains, while lowering the modulus.

Figure 1:
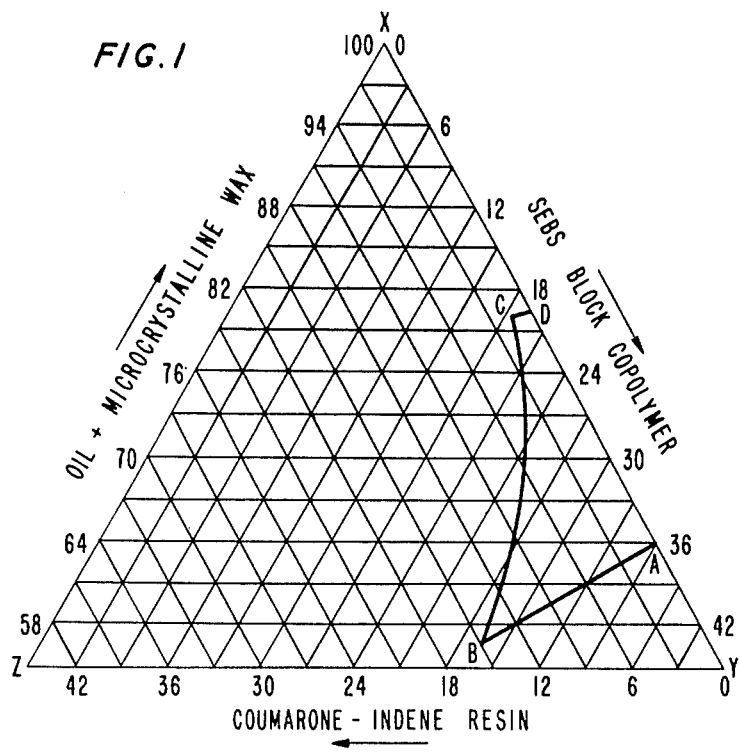
FIG. 1 shows a ternary composition diagram giving the composition range of one embodiment of the fiber coating material of the invention, which can be used as the inner coating of a dual-coated fiber (the area ABCD)
Figure 2:
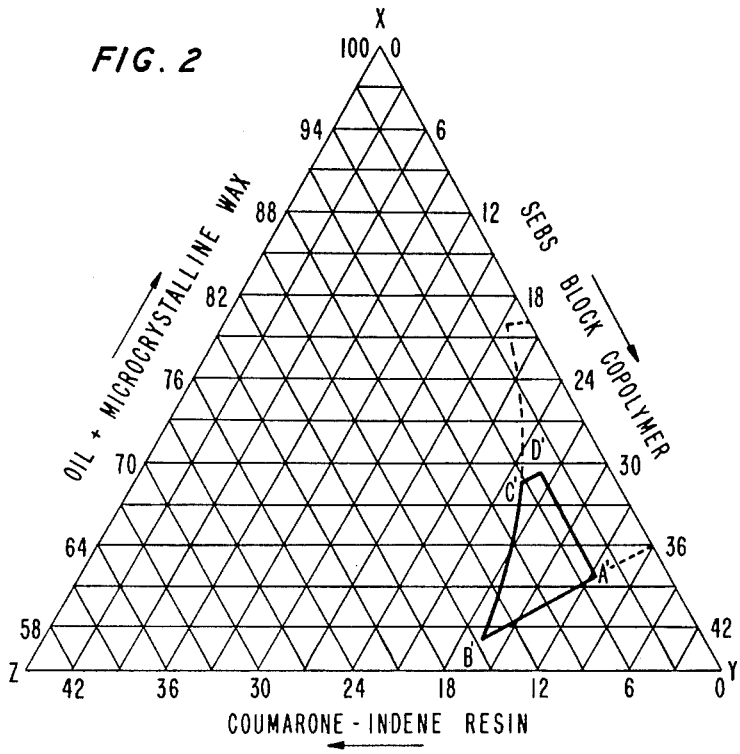
FIG. 2 shows a similar diagram showing a presently preferred composition range for both the single coating and dual coating cases (the area A'B'C'D').

The proportions of the presently preferred components of the material which can be used as an inner coating are indicated in FIG. 1 in the area bounded by ABCD. A subregion of this area, providing a presently preferred material for use as either a single-layer coating, or as the inner layer of a dual-layer coating, is shown in FIG. 2 bounded by A'B'C'D'. The preferred components are listed in Table I below:

TABLE I

| DESCRIPTION OF PREFERRED COMPONENTS | |
|---|---|
| Components | Description |
| Rubber | Styrene-ethylene butylene-styrene block copolymer, styrene/rubber ratio, 0.39 or 0.41, unplasticized; sp.gr., 0.91; percent elongation, 500; 300 percent modulus, ASTM D-412, 700–800 psi. Available from Shell Chemical Co. under trade designations Kraton G1650, 1652. |
| Mineral Oil | White mineral oil having the following nominal properties: Pour point per ASTM D-97, −25 degrees Celsius (−15 degrees F.); SUS viscosity at 99 degrees Celsius (210 degrees F.), 53.7; sp.gr. (ave), 0.884; maximum aromatic oils 1 percent. Available from Penreco, Penzoil Co., under trade designation Drakeol 35. |
| Microcrystalline Wax | A microcrystalline wax having an ASTM D-127 melting point of 91 degrees Celsius, density at 23.9 degrees Celsius by ASTM D-1168 of 0.934 g/cc, a viscosity at 95.8 degrees Celsius by ASTM D-88 of 77.5 SUS, and penetration at 25 degrees Celsius by ASTM D-1321 of 6.5 (0.1 mm). Available from Bareco Division of Petrolite Corp. under the trade designation BeSquare 195. |
| Coumarone-Indene Resin | A coumarone-indene copolymer having a ring and ball softening point by ASTM E28 of 155 degrees Celsius, a specific gravity at 25 degrees Celsius by ASTM D-71 of 1.140, an iodine number of 35 by ASTM D-1959 and a number average molecular weight of 1090 by ASTM D-2503. Available from Neville Chemical Co. under the trade designation Cumar LX 509. |
| Thermal Oxidative Stabilizer | Available from Ciba-Geigy under the trade designation Irganox 1010. |

The following properties are required for a successful dual-layer or single-layer coating material:

Viscosity at 190 degrees Celsius—Must be less than approximately 10,000 centipoises for high draw rate application capability.

Ring and Ball Softening Point (ASTM E28)—Must be greater than approximately 100 degrees Celsius to ensure no significant flow at 90 degrees Celsius.

Tensile Relaxation Modulus at 30 Minutes and −40 degrees Celsius—Must be ≦1.0×10⁸ dynes/cm² for protection from microbending-induced losses.

In addition, the following requirements apply to single-layer coatings:

Blocking—No substantial blocking of coated fiber as wound on a reel. ("Blocking" as used herein refers to sticking of the coated fiber to previously wound fibers that is sufficient to cause damage to the coating when unwound.)

Adhesion to Glass at Room Temperature—A minimum T peel bond strength of approximately 1.0 kg/cm of width where a 0.25 mm thickness of the coating material is bonded between two 0.25 mm thick layers of oriented poly(ethylene terephthalate) film (OPET). Although adhesion of this type of hot melt to glass is not the same as to OPET, the polar nature of both surfaces makes relative comparisons possible. Therefore, to simplify the test procedure, OPET was chosen.

Toughness at Room Temperature—A minimum of approximately 500 psi, taken from the area under a stress-strain curve run per ASTM D-1708 at 225 percent/minute, to ensure protection of the fiber from mechanical damage.

The properties noted above are attained in the present formulations, as follows: A rubber oil ratio of 36/74 produces approximately a 10,000 cps viscosity for a rubber viscosity of 1190 cps, according to the test given below. This ratio is point A in FIG. 1. The oil is preferably a refined mineral oil to prevent discoloration of the coated layer, typically desirable when a coloring substance is added to the formulation.

The substitution of 9 parts of the microcrystalline wax for 9 parts of the oil increases the viscosity the same as increasing the rubber content by about 1.5 parts. Since this is not a significant change, the wax and oil are considered as a single entity in FIGS. 1 and 2.

Substitution of the coumarone-indene resin for the oil significantly increases the viscosity. The effect is greater than would be expected by simply changing the rubber/oil ratio. For every 2 parts of the resin that is added, approximately 1 part of the rubber must be removed to maintain a constant viscosity. This relationship is reflected in the slope of lines AB and A'B' in FIGS. 1 and 2, respectively. The points B and B' are fixed by compatibility limitations described in the next section.

The viscosity of the blends depends not only on the relative composition of the materials, but also on the molecular weight of the thermoplastic rubber in the blend. Kraton® G1650 and Kraton G1652 have the same styrene/rubber ratio but differ in molecular weight. Shell Chemical Company uses the viscosity of a 20 percent solids solution in toluene at 25 degrees Celsius as a measure of molecular weight. The viscosity range for Kraton G1650 and Kraton G1652 is 1000–2000 cps and 350–1000 cps, respectively. The Kraton G1650 used for the tests herein had a 1190 cps viscosity according to the Shell test. The regions defined in FIGS. 1 and 2 were determined for this viscosity of Kraton G1650; other viscosities can also be used. I recommend a viscosity according to this test in the range of 500 to 1800 cps. Very high viscosity (high molecular weight) rubbers, for example Kraton G1651, may be used, but present problems in blending with the other components.

The acceptable regions in FIGS. 1 and 2 are shifted down on the rubber axis by approximately 3 parts by weight in going to high molecular weight Kraton G1650 (viscosity 1800 cps) and are shifted upward by 6 parts of rubber in going to low molecular weight Kraton G1652 (viscosity 500 cps). Similarly, lower molecular weight coumarone-indene resins than Cumar LX 509 can be added at higher levels with less of a viscosity effect.

Substitution of the resin for the rubber, as referred to in the previous section, is governed by compatibility as well as viscosity limitations. Incompatibility is defined here as the resin level at which a 180–190 degrees Celsius solution first becomes hazy. This criterion is reflected as lines BC and B'C' in FIGS. 1 and 2, respectively. The end points C and C' are discussed in subsequent sections.

The Ring and Ball softening point (ASTM E28) was run at a heating rate of 1–2 degrees Celsius/minute as a function of both rubber and resin content. The results indicate a 3 degrees Celsius increase for each part of the resin added and a 2 degrees Celsius increase for a 1 part increase in the rubber. Lower melting resins must be added at higher levels to obtain a similar effect on softening point.

The minimum rubber content for a 100 degrees Celsius softening point composition containing no endblock resin is 19.5 parts. This is the value at point D in FIG. 1. The data on Cumar LX 509 content versus softening point were used with the compatibility data to determine the composition at point C in FIG. 1.

The 30 minute tensile relaxation modulus at −40 degrees Celsius was determined from data taken on a Rheometrics Thermomechanical Spectrometer. The data for compositions both with and without the microcrystalline wax are shown in Table II for blends A and B. The value for the wax-containing composition at −40 degrees Celsius is 9×10⁷ dynes/cm², which is below the 1.0×10⁸ dynes/cm² maximum value set as the requirement. Removal of the wax reduces the modulus by approximately an order of magnitude. Since the wax is controlling in terms of modulus, all the compositions bounded by ABCD in FIG. 1 and A'B'C'D' in FIG. 2 meet the modulus requirement; the data further indicate that compositions containing up to about 12 parts wax also meets the modulus requirement.

TABLE II

VARIATION IN MODULUS WITH WAX CONTENT

| | Formulation | |
|---|---|---|
| | A | B |
| | (Parts by Weight) | |
| Component | | |
| Rubber (Kraton G1650) | 27 | 27 |
| Mineral Oil (Drakeol 35) | 56 | 65 |
| Coumarone-Indene Resin (Cumar LX 509) | 7 | 7 |
| Microcrystalline Wax (BeSquare 195) | 9 | — |
| Stabilizer (Irganox 1010) | 1 | 1 |
| Total Parts | 100 | 100 |
| Property | | |
| 30 Min. Tensile Relaxation Modulus (dynes/cm²) | | |
| At 25 degrees Celsius | 9 × 10⁶ | 1.5 × 10⁶ |
| At −40 degrees Celsius | 9 × 10⁷ | 1 × 10⁷ |

Microcrystalline and polyethylene waxes were also evaluated with respect to blocking. Both plaque and fiber coating experiments were run. In the plaque tests, a load of 6 g/cm² was placed on top of two layers of coating material, each layer about 1.20 mm thick. The coatings contained 10 parts each wax and coumarone-indene resin, with the balance being rubber and oil. The tests were run for one hour at a series of temperatures. The 91 degrees Celsius (195 degrees F) melting point microcrystalline wax prevented blocking up to 50 degrees Celsius, with some blocking noted at 64 degrees Celsius. A 116 degrees Celsius melting polyethylene wax containing material did not block at 42 degrees Celsius, but did at 50 degrees Celsius.

In these coating experiments, the coatings were placed on 110 μm OD fiber in-line with drawing. The coated fiber OD was approximately 225 μm. Fiber coated with material containing no wax could not be removed from the wind-up reel without either damaging the coating or breaking the fiber. When the coating contained 10 parts of 116 degrees Celsius melting point polyethylene wax but no coumarone-indene resin, severe blocking still occurred. Including 10 parts of coumarone-indene resin with the polyethylene wax gave a much improved, but marginal performance. Use of the 195 degrees F melting point microcrystalline wax and the coumarone-indene resin gave coated fiber which did not block.

The prior discussion indicates that both the microcrystalline wax and the coumarone-indene resin are functional in allowing the coated fiber to be removed from the take-up reel without damaging the fiber. For this reason, the compositions to be used as single-layer coating (or the outer layer of a multiple-layer coating) desirably contain about 9 parts of microcrystalline wax and some level of the coumarone-indene resin. A level of microcrystalline wax up to about 12 parts appears to be feasible in the present formulation, with even higher levels possible for lower melting point (softer) waxes than the preferred wax used herein. In the case of dual-layer coatings, wherein the inner layer need not be optimized to prevent blocking, the wax used can alternately be paraffin, or polyethylene, among others.

A material which is adhered to a substrate is more effective in protecting that substrate from mechanical damage than an unadhered material having the same mechanical properties. The coumarone-indene resin improves adhesion of the coating to the glass fiber. In the case of a single-layer coating, the improved adhesion is highly desirable to protect the fiber.

As a measure of adhesion, T peel testing was conducted on composites consisting of a 0.25 mm thickness of coating material between two 0.25 mm thick sheets of oriented poly(ethylene terephthalate) film. The composites were prepared in a press at 180 degrees Celsius using a molding frame to maintain the coating thickness. T peel measurements were made at 5.0 cm/minute. Based on these data, a coumarone-indene content of approximately 3.5 percent by weight with a minimum of 24 percent by weight rubber is sufficient to give T peel bonds of at least 1.0 kg/cm of width. These data then define the boundary line A'D' in FIG. 2. In the case of dual-layer coatings, the protection afforded the fiber by improved adhesion is not necessary in all cases. Therefore, the amount of coumrone-indene resin can be as low as zero, as indicated by line AD in FIG. 1.

The toughness of the coating, as well as the coating-to-fiber adhesion which was previously discussed, reflects the ability of the coating to protect the fiber from mechanical damage. One source of potential damage is the proof-test procedure during manufacture, whereby the coated fiber is contacted by wheels or other members while under stress. Toughness is defined herein as the area under the stress-strain curve obtained on microtensile specimens (ASTM D-1708) run at 50 mm/minute (about 225 percent/minute). Toughness measurements indicate a strong dependence of toughness on both the SEBS rubber and coumarone-indene resin content. These data show that the formulation A'B'C'D' shown in FIG. 2 meets the 500 psi toughness requirement. The line C'D' defines formulations having the minimum toughness, about 500 psi. The blend of point B' gives a maximum toughness of approximately 1300 psi. As a comparison, Shin-Etsu's KE106, a silicone material marketed for optical fiber coating, has a toughness of about 550 psi and an elongation of about 150 percent in this test. However, to protect the fiber from proof-test or other damage, including microbending loss, the thickness of one or more coated layers can be increased compared to the Examples herein, while relaxing the toughness requirement noted. I estimate that a coating formulation that omits the coumarone-indene end-block resin can be successfully used on a fiber proof-tested at less than 100,000 psi. For fibers designed to be proof-tested about this level, I recommend the inclusion of an end-block resin. However, the resin can also be included in thick coatings; for example, to help the coating toughen at a higher temperature following application to the fiber.

Formulation A in Table II was evaluated as a buffer coating on optical fiber drawn from germanium phosphosilicate preforms. A UV curable overcoat with a 30 minute tensile relaxation modulus of approximately $6 \times 10^9$ dynes/cm² at 23 degrees Celsius and approximately $3 \times 10^{10}$ dynes/cm² at $-40$ degrees Celsius was used as the outer coating. Both coatings were applied in-line with drawing. The hot melt formulation was filtered prior to application in a stainless steel cartridge filter having a 5 micron rating. Filtering is desirable to reduce the occurrence of particles in the melt, which can degrade the tensile strength of the coated fiber. Both the inner and outer coatings were applied by passing the fibers through two successive open cup coating applicators having flexible tips. In all the tests, fiber coated only with the UV material was used as a control.

EXAMPLE 1

Fiber having a 110 μm OD and with a 2/1 core/cladding ratio was coated as described above. The dual-coated fiber had an inner coating OD of about 175 μm and a total-coated OD of about 230 μm. The control fiber had a coated OD of about 230 μm.

Two ribbons approximately 1 km long were manufactured, one with each coated fiber type. Each ribbon consisted of 12 fibers sandwiched contiguously between two layers of a polyester pressure sensitive coated tape. (This "ribbon" configuration is further described in U.S. Pat. No. 4,096,010, coassigned with the present invention.) The average added loss of the fibers in each ribbon was determined at $-10$, $-26$, and $-43$ degrees Celsius. The "added loss" is compared to the same ribboned fiber at room temperature (24 degrees Celsius). These data, shown below, indicate a much lower sensitivity to microbending for the dual-coated fiber:

| Coated Fiber Type | Added Loss at 0.82 μm (dB/km) | | |
|---|---|---|---|
| T° C.: | −43 | −26 | −10 |
| Control (UV) | 0.51 | 0.26 | 0.06 |
| Dual (Hot Melt/UV) | 0.16 | −0.05 | −0.04 |

EXAMPLE 2

The fiber and ribbon manufacturing procedure in Example 1 was repeated with the exception that the fiber OD was 125 μm and the cladding/core ratio was 2.5/1. The coated fiber diameter was approximately the same as in Example 1. Three filled cables were manufactured having ribbons of each coated fiber type. The average added loss of the control fiber in going from the ribbon to the cable was 1.67 dB/km, as compared to 0.11 dB/km for the dual-coated structure.

Based upon the above tests, the presently preferred composition for use as the inner layer of a dual-layer coating has the formula A in Table II above, with an acceptable variation of at least plus or minus 1 weight percent for the major components, and plus or minus 0.5 percent for the antioxidant.

While preferred components and formulation ranges have been disclosed herein, persons of skill in the art can extend these ranges using appropriate material, according to the principles discussed herein. Furthermore, other coating sequences, such as a relatively low modulus hot melt inner layer followed by a high modulus hot melt outer layer, are possible, as is the use of triple-layer coatings, etc. A nitrogen atmosphere is desirable to further extend the lifetime of the material in the applicator and reservoir if the material is heated above about 200 degrees Celsius. All such variations and deviations which rely on the teachings through which the present invention has advanced the art are considered to be within the spirit and scope of the present invention.

What is claimed is:

1. A coated optical fiber comprising an optical fiber and one or more coated layers thereon, characterized in that
at least one coated layer comprises a mixture of: (X) An ASTM type 103, 104A, 104B, or mixture thereof, napthenic or paraffinic oil, with a wax optionally substituted for a portion of said oil; (Y) a styrene-rubber-styrene block copolymer having a styrene-rubber ratio of 0.2 to 0.5; and optionally further comprises (Z) a coumarone-indene or vinyl toluene −α methyl styrene copolymer that associates with the styrene end-blocks of said block copolymer; and further comprises a thermal oxidative stabilizer.

2. The coated optical fiber of claim 1 wherein said styrene-rubber-styrene block copolymer is a styrene-ethylene butylene-styrene block copolymer, and said optional copolymer that associates with the styrene end-blocks is a coumarone-indene copolymer.

3. The coated optical fiber of claim 2 wherein the ingredients X, Y, and Z have relative proportions falling within the shaded area bounded by ABCD of FIG. 1.

4. The coated optical fiber of claim 2 wherein the ingredients X, Y, and Z have relative proportions falling within the shaded area bounded by A'B'C'D' of FIG. 2.

5. The coated optical fiber of claim 3 or 4 wherein 0 to 12 percent microcrystalline wax substitutes for 0 to 12 percent of said oil, based on total weight percentage of said mixture.

6. The coated fiber of claim 3 or 4 wherein said at least one coated layer is the inner layer of a dual layer coated fiber.

7. The coated fiber of claim 1 wherein said at least one coated layer is the inner layer of a dual-layer coated fiber, and wherein said mixture comprises by weight 55 to 57 percent oil; 26 to 28 percent styrene-ethylene butylene-styrene block copolymer; 6 to 8 percent coumarone-indene resin, 8 to 10 percent microcrystalline wax, and 0.5 to 1.5 percent thermal oxidative stabilizer.

8. A method of making a coated optical fiber by steps comprising applying a coating material to an optical fiber, or to a previously coated layer thereon, characterized in that
said coating material comprises a mixture of: (X) An ASTM type 103, 104A, 104B, or mixture thereof, napthenic or paraffinic oil, with a wax optionally substituted for a portion of said oil; (Y) a styrene-rubber-styrene block copolymer having a styrene-rubber ratio of 0.2 to 0.5; and optionally further comprises (Z) a coumarone-indene or vinyl toluene −α methyl styrene copolymer that associates with the styrene end-blocks of said block copolymer; and further comprises a thermal oxidative stabilizer.

9. The method of claim 8 wherein said coating material forms the inner layer of a dual-layer coated fiber, and wherein said styrene-rubber-styrene block copolymer is a styrene-ethylene butylene-styrene block copolymer, and said optional copolymer that associates with the styrene end-blocks is a coumarone-indene copolymer, wherein the ingredients X, Y, and Z have relative proportions falling within the area ABCD of FIG. 1.

10. A coated optical fiber made according to the method of claim 8.

* * * * *